March 28, 1961 F. VAN MARLE 2,976,803
ARTICLE MARKING AND ORIENTING MACHINE
Filed Jan. 15, 1957 10 Sheets-Sheet 1

INVENTOR.
FREDERICK VAN MARLE
BY
ATTORNEY

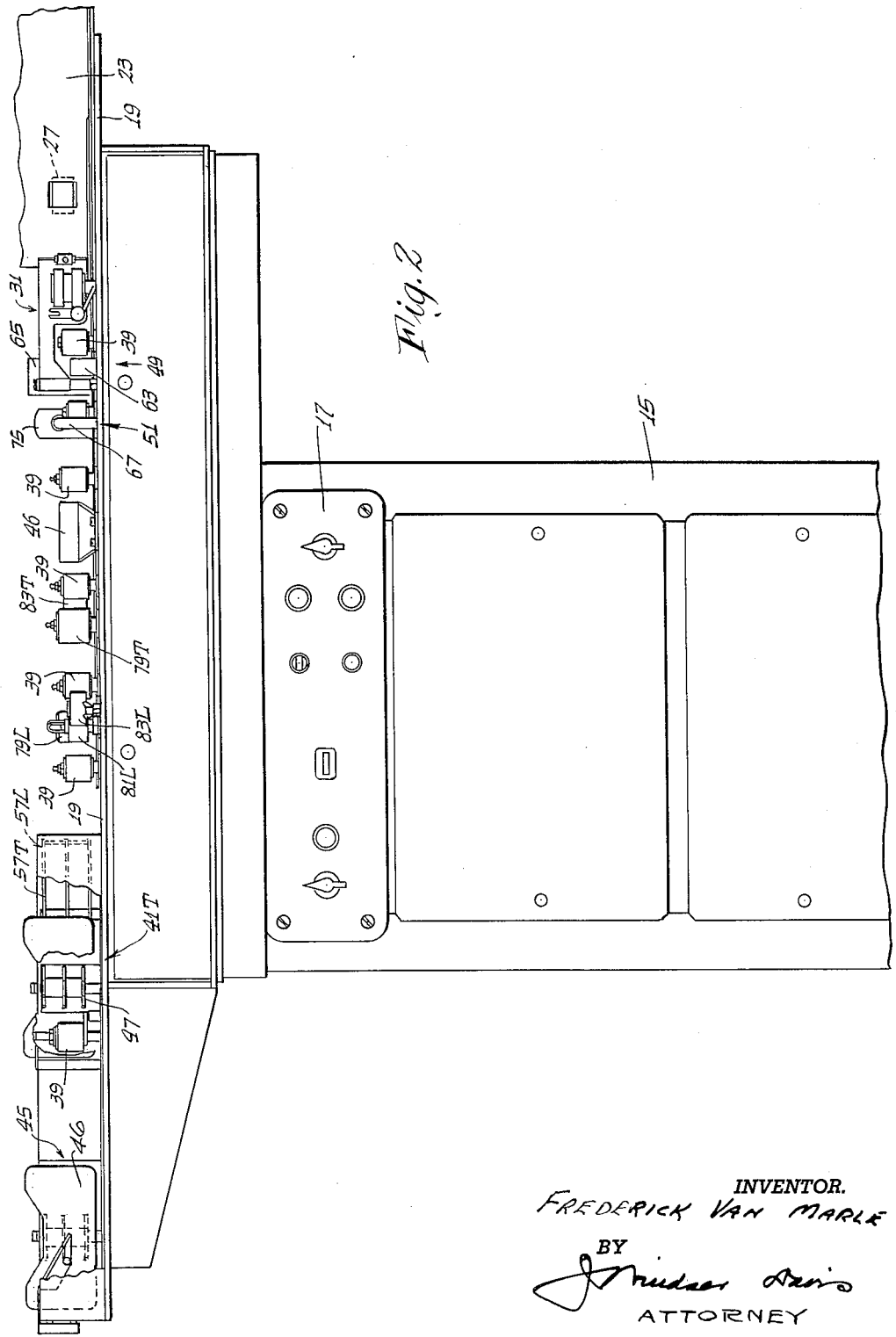

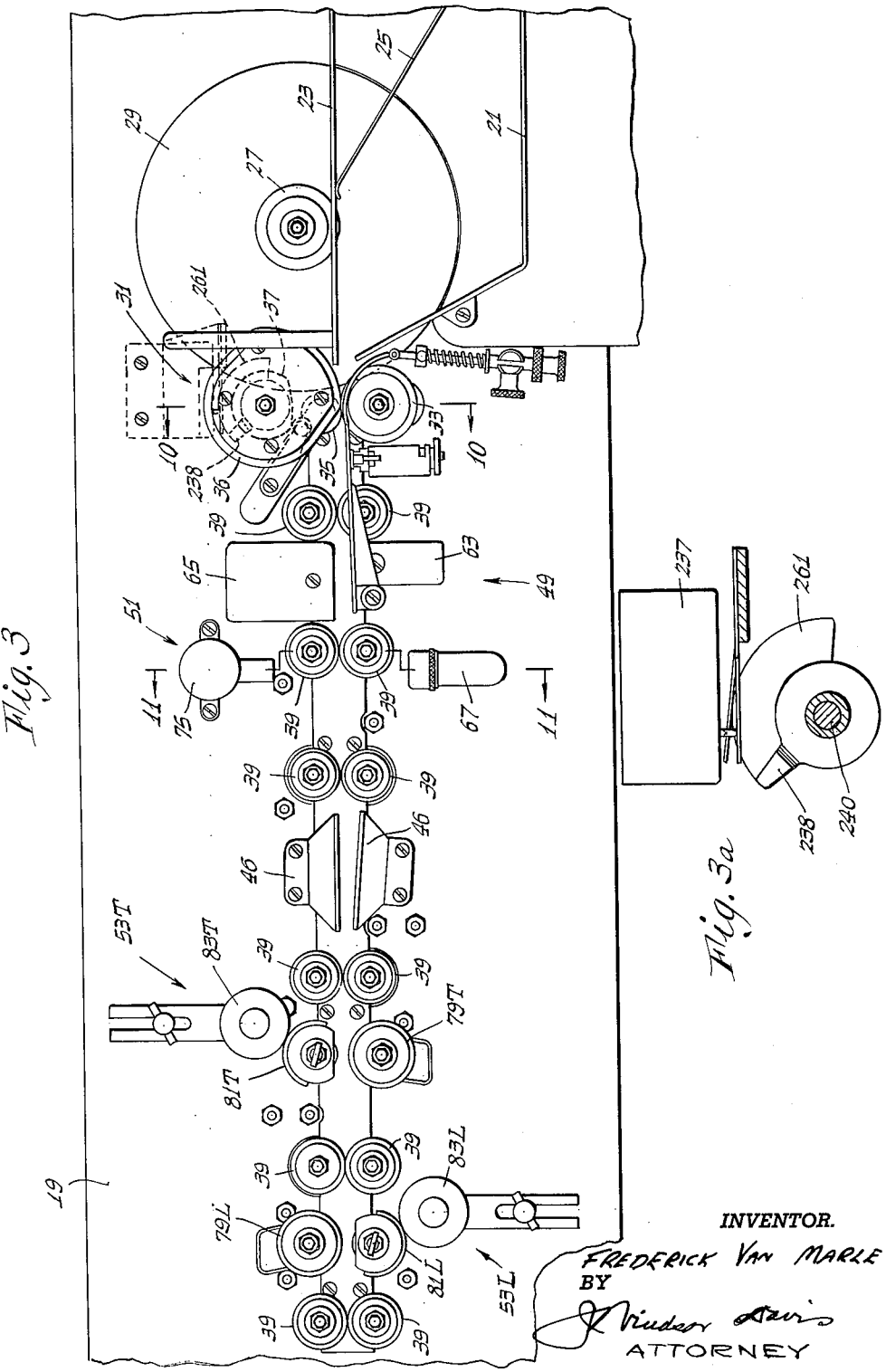

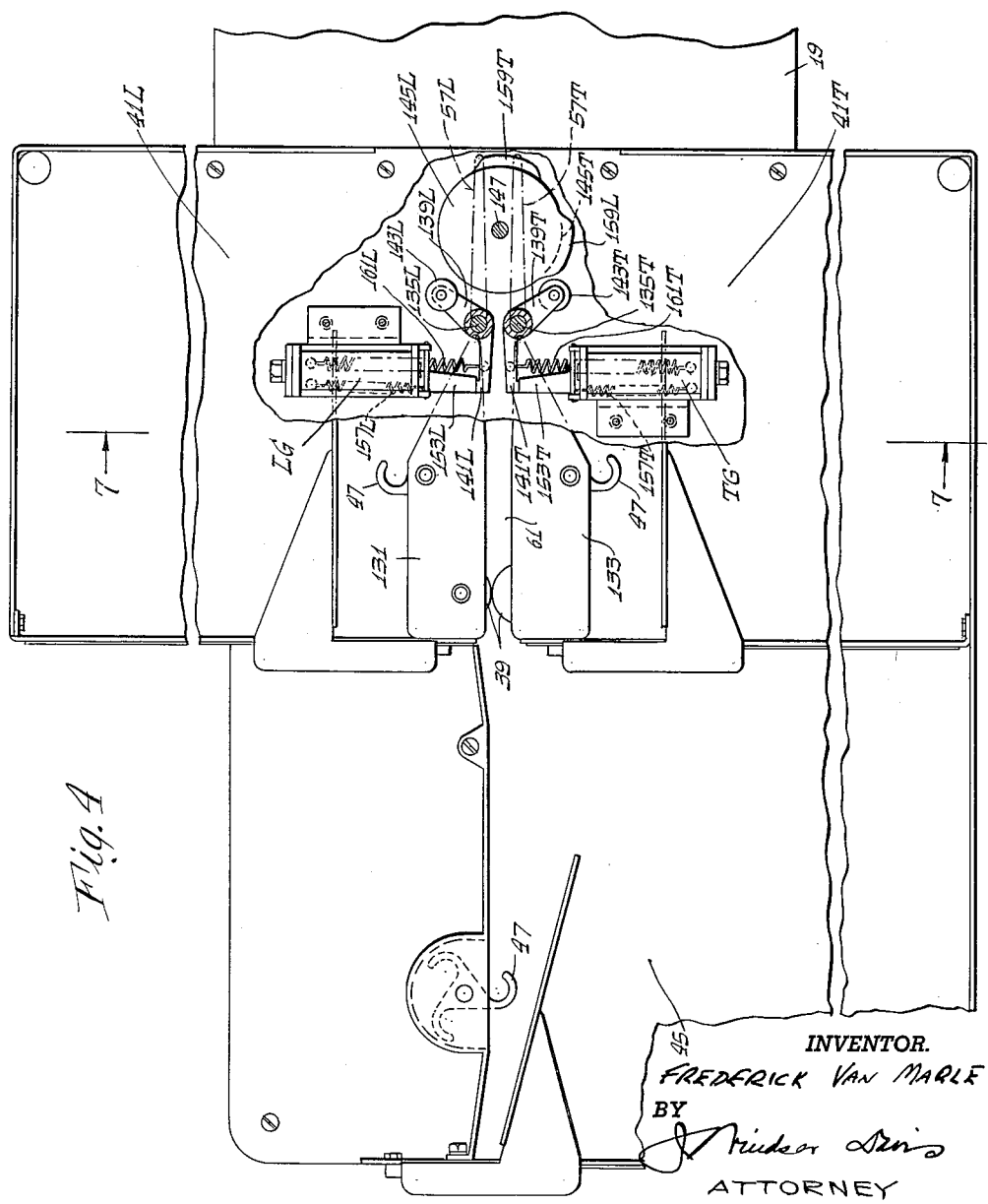

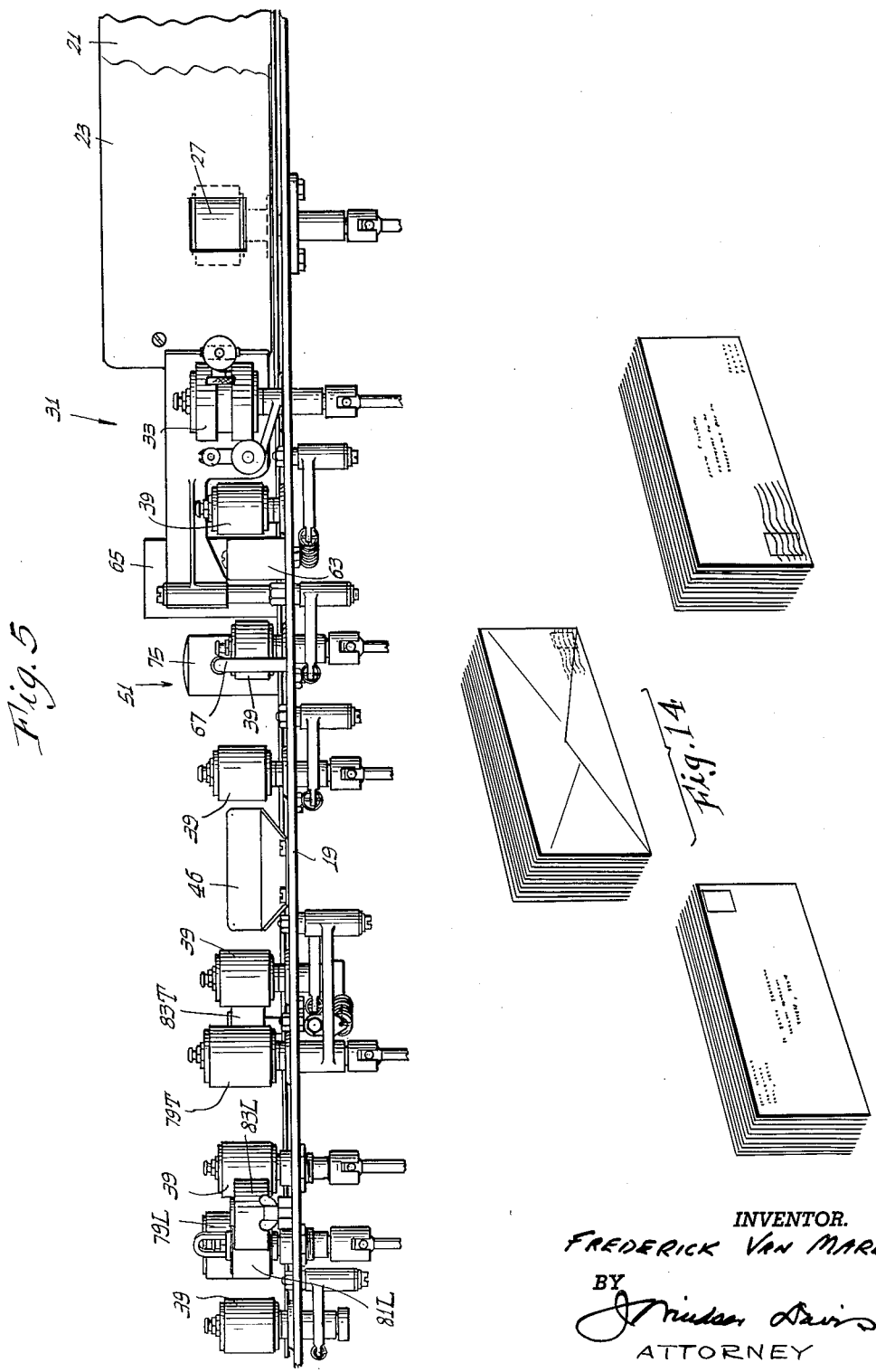

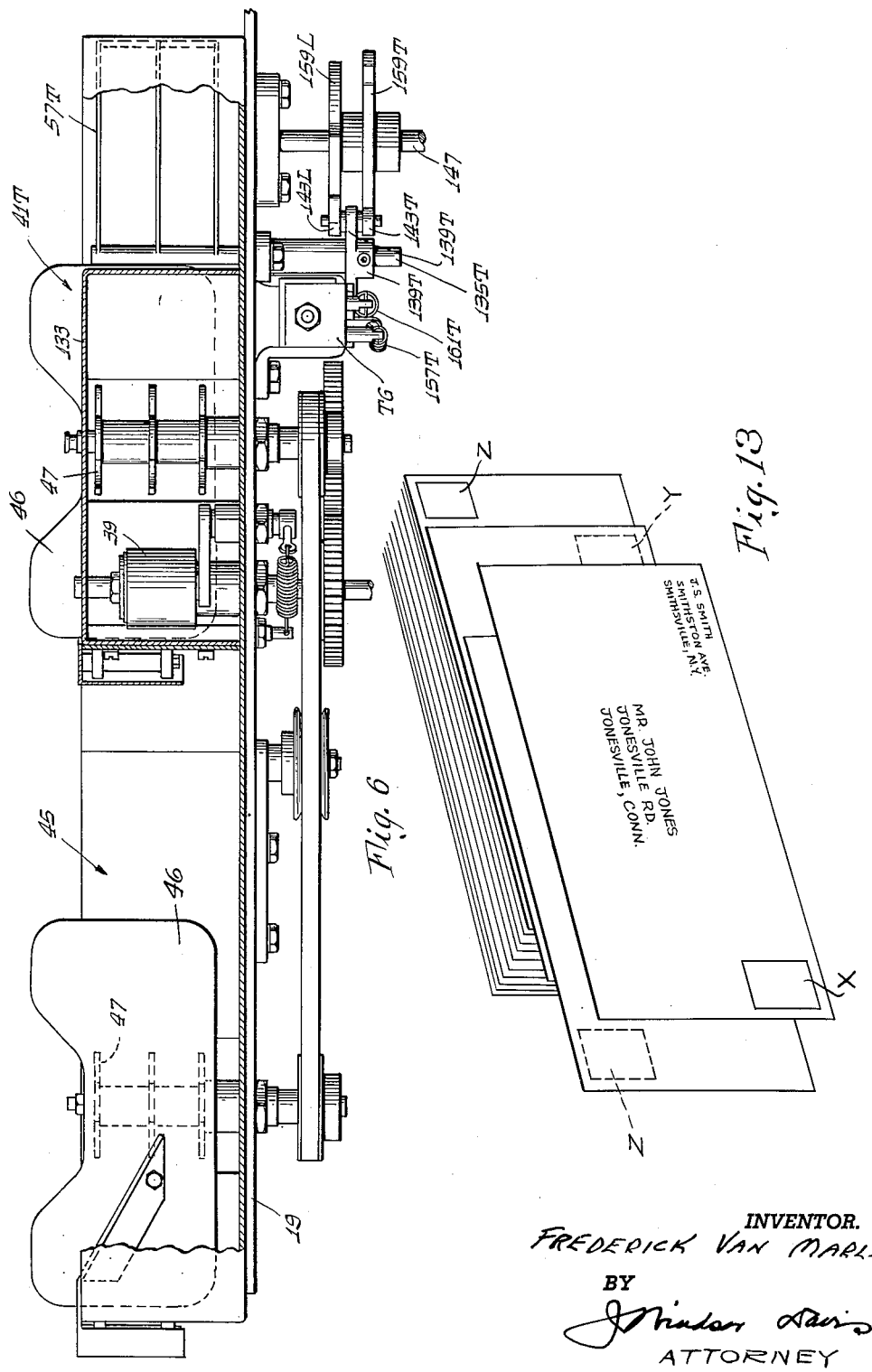

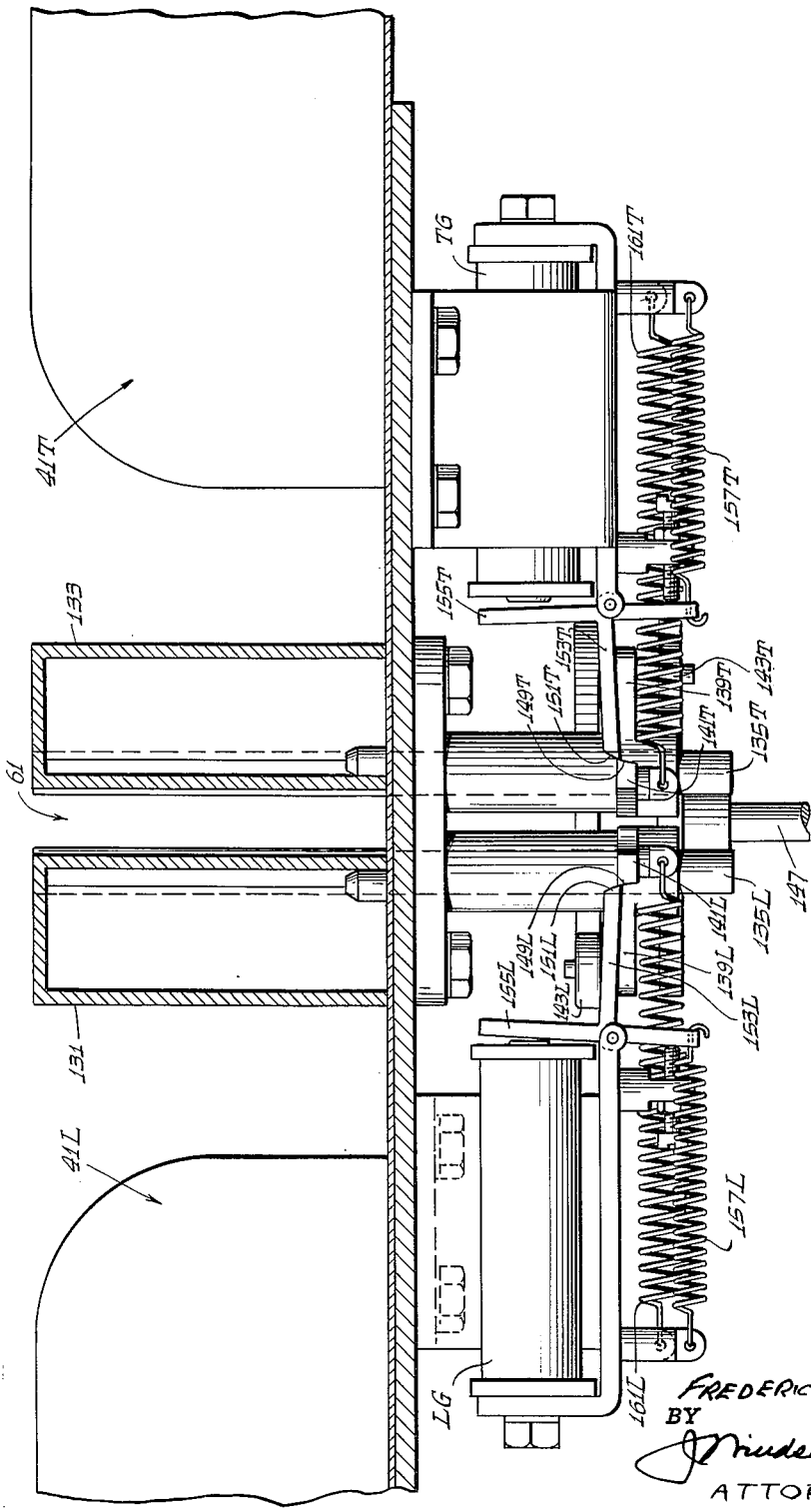

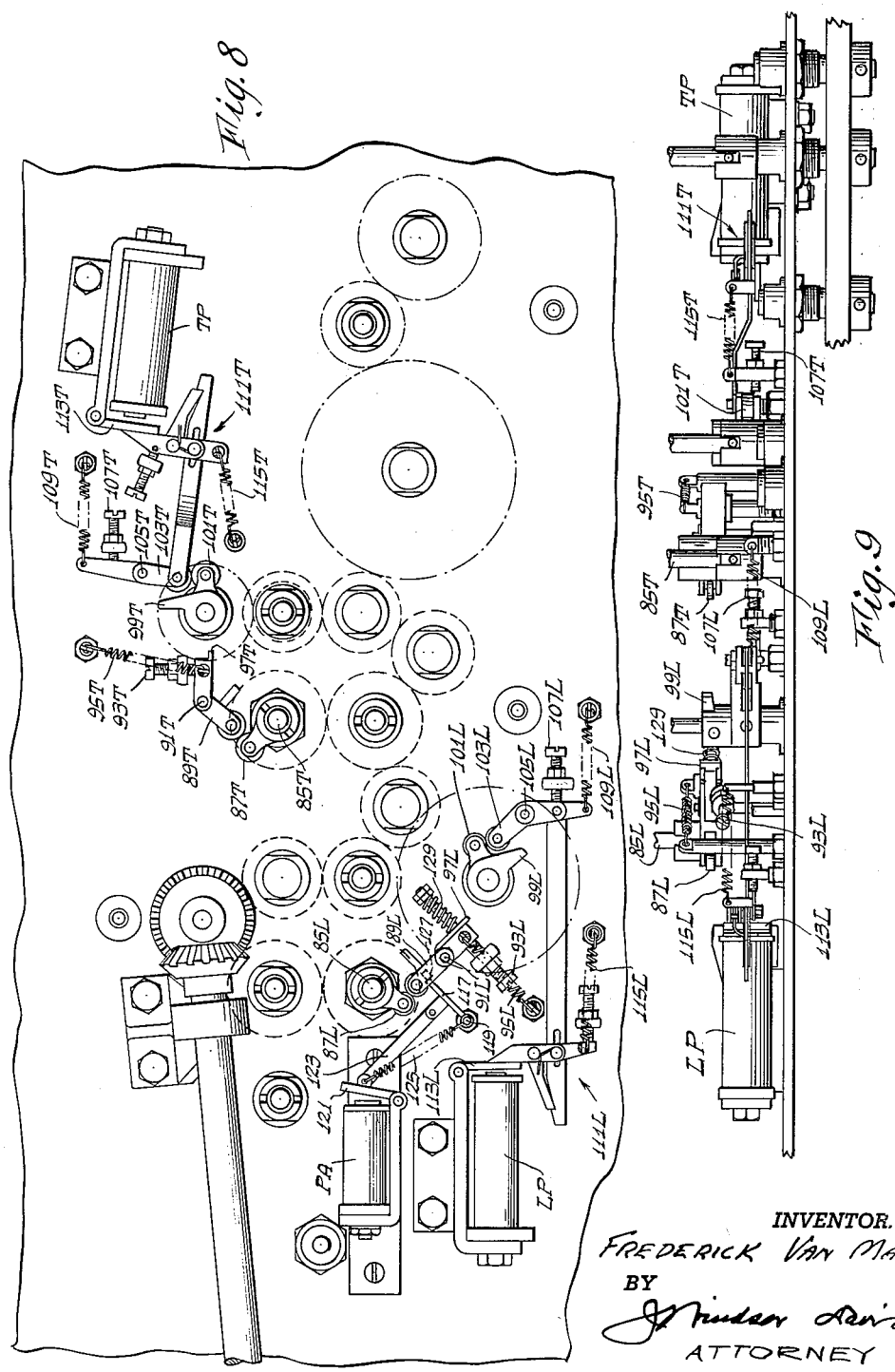

March 28, 1961   F. VAN MARLE   2,976,803
ARTICLE MARKING AND ORIENTING MACHINE
Filed Jan. 15, 1957   10 Sheets-Sheet 9

INVENTOR.
FREDERICK VAN MARLE
BY
ATTORNEY

March 28, 1961 F. VAN MARLE 2,976,803
ARTICLE MARKING AND ORIENTING MACHINE
Filed Jan. 15, 1957 10 Sheets-Sheet 10

INVENTOR.
FREDERICK VAN MARLE
BY
ATTORNEY

United States Patent Office 2,976,803
Patented Mar. 28, 1961

2,976,803

ARTICLE MARKING AND ORIENTING MACHINE

Frederick Van Marle, The Hague, Netherlands, assignor to N.V. Technische Maatschappij Marchand-Andriessen, The Hague, Netherlands, a limited-liability company of the Netherlands Filed Jan. 15, 1957, Ser. No. 634,211

3 Claims. (Cl. 101—236)

This invention relates to article handling and treating and especially to the marking and/or orienting of a plurality of articles fed in succession past a predetermined point.

It is an object of the present invention to provide for marking a succession of randomly oriented articles, each having a designator thereon indicating a predetermined location for a mark, and for marking each such article at its predetermined location as it passes in the succession.

According to the present invention this may be accomplished by sensing the designator as each article passes a predetermined point, and then printing on the article at a position conditioned by the sensed location of the designator, or not printing in case no designator is sensed.

Another object of the invention is to provide, in a marking arrangement as aforesaid, for separately collecting articles marked and unmarked, and in some cases for further separately collecting marked articles in accordance with their orientation.

The present invention, in the form shown and described, is particularly adapted for handling randomly oriented mail to cancel the postage stamps thereon and/or sort the same into groups faced in one direction. Heretofore it has been known to cancel stamps on envelopes by automatic feeding and canceling machines, but these have required that a stack of envelopes supplied to them first be "faced," i.e. arranged with all envelopes oriented in one direction. This operation has normally been performed by hand and is a tedious and time-consuming matter. If not done by hand, additional bulky and space-consuming equipment has been required to perform the operation automatically.

It is another object, therefore, of the present invention to provide for automatically handling and canceling mail without first facing the same.

Another object of the invention is to provide a single compact device for canceling stamps on mail which performs a canceling operation on the stamps even though the envelopes are fed to it with random orientation, and then separately collects the canceled envelopes in accordance with their orientations, so that the output of the device is, in effect, faced and ready for other operations such as destination sorting.

Another object of the invention is to provide an envelope facing device of simplified compact construction.

It is still another object of the present invention to provide for handling mail including the facing or facing and canceling thereof by taking stamp location readings adjacent a single guided edge, whereby letters, even though of varying lengths, can be readily accommodated without pre-sorting of the envelopes into groups having lengths within prescribed ranges or as normally known as long and short mail pieces.

In connection with the foregoing object, it is also an object of the invention to provide for feeding and handling of letters, even though of random length, in such a way that stamps located adjacent the guided lower edges of the envelopes are sensed and the letters are fed to and stacked at one or the other of two collection points according to the front or back positions of the stamps sensed, and fed to and stacked at a third collection point whenever no stamp is sensed due to being along the upper edge. In this manner a stack of randomly oriented envelopes, except for a few irregulars such as unstamped envelopes, can receive a facing treatment, a canceling treatment, or both, by merely passing the entire group, after straightening, once through the treatment outlined above, and thereafter passing those envelopes found at the third collection point through the treatment a second time in inverted position.

Another object of the invention is to provide for automatic letter handling in such a way that a minimum number of sensing devices at an initial detection station is arranged to control the subsequent sorting of envelopes into groups of those facing in certain directions, proper cancellation of envelopes with stamps on different surfaces, or both.

Still another object of the invention is to provide in a canceling machine for automatically detecting the presence on an envelope of a line of stamps too long for the cancellation mark to deface adequately, and for separating such an envelope and feeding it to a separate reject storage point to await separate manual treatment.

Additional objects of the invention are to provide for the timing of cancellation printing at the proper instant on an envelope being fed through a canceling machine, whether the stamps are arranged adjacent the leading edge or the trailing edge of the envelope, and further to control the timing of the printing operation by a sensing of the said adjacent edge as it passes a predetermined location.

Still another object of the invention is the provision of novel automatic guiding and stacking means for accumulating envelopes fed from a single feed path in three distinct locations depending on stamp location, and including gate means located at a point in said feed path and operated in time with envelope feed movement for effecting proper separation of the envelopes.

Additional objects, features and advantages will appear hereinafter as the description proceeds.

For purposes of illustration and explanation, the invention is shown in detail in its preferred form in the accompanying drawings, wherein:

Fig. 2 is a front elevation of the device of Fig. 1;

Fig. 3 is a top plan of the right hand or feeding and canceling portion of the device of Fig. 1, drawn to a larger scale;

Fig. 3a is a detail plan section illustrating a small area shown in dotted lines in Fig. 3, and taken substantially on line 3a—3a of Fig. 10;

Fig. 4 is a top plan of the left hand or stacking portion of the device of Fig. 1 to a larger scale, with portions of the deck broken away to illustrate the gate operating mechanism;

Fig. 5 is a partial front elevation of the upper portion of the device of Fig. 3 with the drive housing cover removed;

Fig. 6 is a partial front elevation of the upper portion of the device of Fig. 4 with the drive housing cover removed, and drawn to a slightly larger scale;

Fig. 7 is an enlarged section taken substantially on line 7—7 of Fig. 4;

Fig. 8 is a top plan of a portion of the device with the upper deck removed and showing especially the geared shafting and solenoids which control the operation of the canceling dies;

Fig. 9 is a side elevation of the mechanism shown in Fig. 8;

Fig. 13 shows a group of mail pieces with the four forwardmost pieces arranged to indicate the four positions at which stamps could appear in a group of mail pieces which is about to be placed in the machine for a first canceling and stacking operation; and Fig. 14 shows the three positions the mail pieces of Fig. 13 could assume after completing the first run through the machine.

Figure 1:
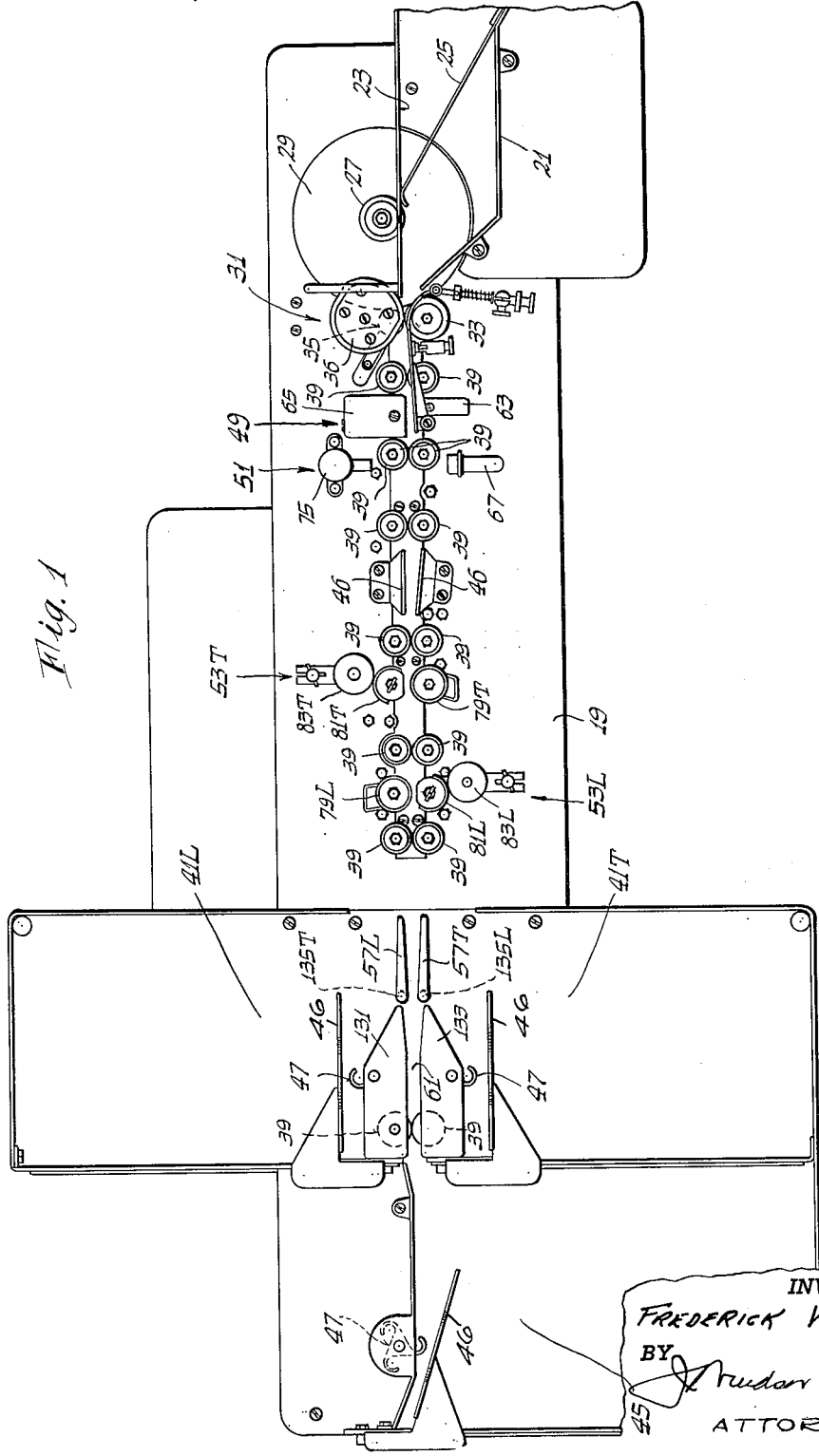
Fig. 1 is a top plan of a letter facing and/or stamp canceling machine according to the present invention.

Referring to the drawings, the invention is shown embodied in a machine including a base 15 which houses the motive power and electrical circuits, and carries a control panel 17 placed in a convenient location for operation. The upper cover 19 of the machine, herein referred to as the deck, carries the letter handling elements about to be described. At the right hand end is a hopper 21 into which stacks of letters may be inserted in a vertical, on-edge position. One wall 23 of the hopper is a guide wall, and a spring finger 25 serves to urge the contained envelopes against this wall. A continuously rotating booster roller 27 exposed through an opening in wall 23 and connected turntable 29 which projects slightly above deck 19 serve to frictionally urge the envelopes towards the nip of a separating and feeding device 31. The device 31 includes a roller 33 driven continuously in a direction opposing the flow of envelopes outward from the hopper 21, and an opposing freely rotating roller 35 resiliently urged against the reversely rotating roller 33 which forms therewith a stop for the envelopes until feeding is required. A friction feeding element in the form of a rotating sector 36 having a non-circular shape and driven at constant speed in a feeding direction periodically picks the endmost envelope from the stack of envelopes in the hopper 21 and feeds it forward, while the roller 33 prevents the feeding of the next envelope thereto. The stop roller 35 is automatically retracted, as by cam means 37 (Fig. 10) to disable the same each time the feed element 36 approaches operative position. The feed element 36 thus separates and feeds one envelope at a time from the hopper 21, and feeds the envelopes in a series at a constant rate with their leading edges spaced a given distance apart, e.g. about fifteen inches. The separating and feeding device 31 is described and explained at length in my copending application, Serial No. 499,483, filed April 5, 1955, which application is directed primarily thereto. While it is presently preferred to use the separating and feeding device of the type shown, it will be understood that other feeding devices will in many cases be equally effective.

As an envelope is moved forward by the feeding element 36 it is picked up by the first of a series of constantly rotating feed rollers 39 which operate in pairs to pass it from one to the other carrying it the length of the machine and ultimately into one of three stackers 41T, 41L and 45, each equipped with the usual star wheel 47 for displacing the stack endwise as each incoming envelope approaches. Suitable guards or guides, such as 46, are introduced at appropriate locations to confine the envelopes to the desired path.

In its progress along the envelope path defined by the feed rollers 39, an envelope passes adjacent firstly a stamp detecting device 49, secondly an envelope edge sensing device 51, thirdly a stamp canceling printer 53T for operating on the right side of the envelope (looking toward the trailing end thereof from the hopper 21), and fourthly a stamp canceling printer 53L for operating on the left side of the envelope. A pair of gates 57T and 57L then serve to guide the envelope into either one or the other of stackers 41T and 41L, or into a central channel 61 which leads to the stacker 45 via the last pair of feed rollers 39.

The separating and feeding device 31, the feed rollers 39, and the star wheels 47 are all rotated by suitable driving connections, including, for example, interconnecting gearing as indicated in dotted lines in Fig. 8, from a suitable common source of mechanical power (not shown).

The printers 53T and 53L are similarly served with power from the same source, but include in their particular driving trains friction clutches (not shown) which permit them to be held against rotation except when printing is required, as will presently appear.

*Sensing devices*

More particularly, the stamp detector 49 is shown as being an RF pickup consisting of a primary coil 63 and a secondary coil 65 whose coupling is disturbed by the passage therebetween of a conductive and consequently shielding object, it being contemplated that the postage stamps to be used with the device will be of a type having a thin metallic coating or metal foil lamina in their make-up for this particular purpose. It will be understood, however, that photoelectric or other means may be employed for stamp sensing in a similar manner without departing from the scope of the present invention.

Figure 11:
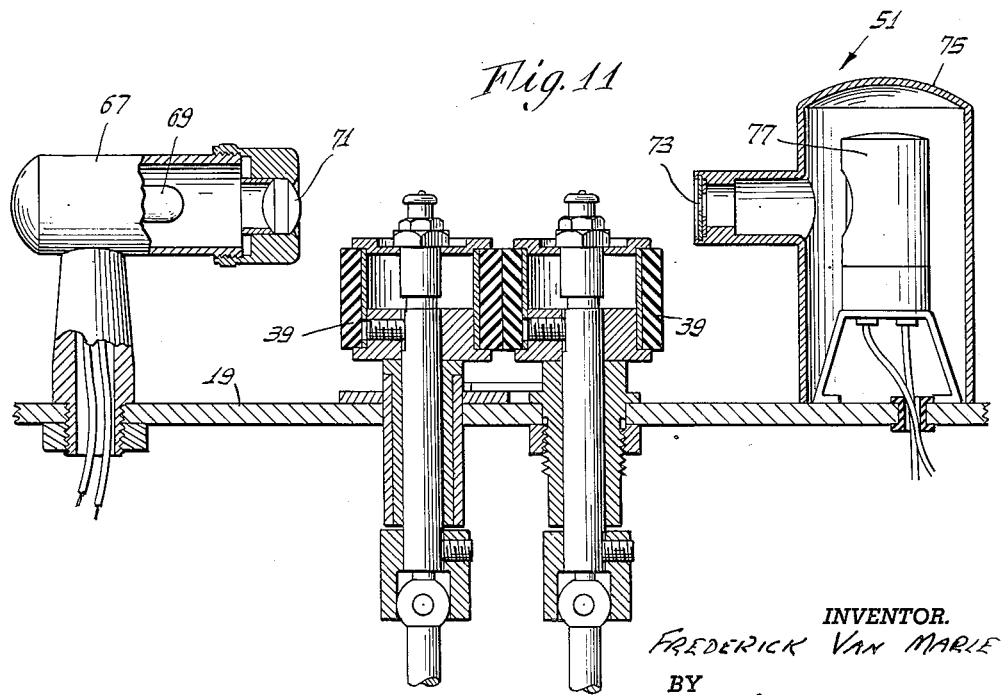
Fig. 11 is a section taken substantially on line 11—11 of Fig. 3, and drawn to a larger scale.

The envelope edge-sensing device 51 shown, as seen in detail in Fig. 11, consists of a housing 67 enclosing a source of illumination or lamp 69. The light from the lamp 69 is beamed via lens 71 against the aperture 73 of a housing 75 in which is mounted a photoelectric cell 77. The parts are so arranged that an envelope passed along the feed path by rollers 39 will necessarily intercept the beam from lamp 69 and momentarily prevent its illumination of the aperture 73.

*Printers*

The device of the present invention is capable of printing stamp cancellation marks on whichever face of the envelope the stamp appears, and accordingly two canceling or printing units are provided as generally indicated at 53T and 53L. These are preferably arranged to cancel stamps which appear near the lower edge of the envelope, that is, when the envelope is in its normal canceling position with the upper edge downward. With the stamp in its conventional location (the upper right hand corner of the envelope when applied) it will now appear near the forward or leadnig end of the envelope if on the left hand face, as viewed from the hopper end, or near the trailing end if on the right hand face, as clearly shown in Fig. 13. The reference characters 53L and 53T designate the "lead" printer and "trail" printer respectively. Each of the printing units includes a conventional impression roller 79, printing die 81, and inking roller 83, the numeral being followed by a postscript T or L, depending upon the printer of which it forms a part. The operating mechanism for the printing units is best shown in Figs. 8 and 9 and will be described in detail with respect thereto. The trail printing die 81T of trail printer 53T is driven by a train including the shaft 85T, and further including a suitable friction slip clutch (not shown) as heretofore mentioned. A stop projection 87T terminating in a roller surface is affixed to the shaft, and is normally interfered with by a roller tipped latch 89T which is rockable on a pivot 91T and held in interfering position against an adjustable stop 93T by a spring 95T. The latch 89T has a lip 97T which lies in the path of a rotary timed trip element 99T driven through a friction slip clutch (not shown) from the main driving train. The trip element 99T also carries with it a roller tipped stop projection 101T which is normally interfered with by a second roller tipped latch 103T rockable on a pivot 105T and held in interfering position against an adjustable stop 107T by a spring 109T. A linkage 111T is connected between the latch 103T and the armature 113T of a trail print solenoid TP, and includes a return spring 115T for the armature, the linkage serving to withdraw the latch 103T whenever the solenoid TP is energized. It can be seen from the arrangement shown in Fig. 8 that whenever solenoid TP is energized, a series of events follow automatically, in which latch 103T is withdrawn to permit rotation of rotary timed trip 99T which travels through a predetermined arc, eventually striking lip 97T of latch 89T and withdrawing the latter to permit rotation of shaft 85T and printing drum 81T which thus occurs at a predetermined time delay after the energization of solenoid TP. The trip element 99T then continues on around after clearing the lip 97T, to be brought to rest again with its stop projection 101T resting against the latch 103T, which in the meantime will have been returned to its normal position in response to deenergization of the solenoid TP. The amount of delay introduced can be set exactly to the value desired within certain limits by adjusting stop screws 107T and 93T.

The lead printer 53L merely has its printing die 81L on the opposite side of the envelope path from the die 81T of the trail printer 53. For the most part, the control and operating elements correspond to those of the trail printer, and similar parts have been designated by the number of the corresponding part in the trail printer mechanism, except that the postscript "L" is substituted for "T" in each case, and the solenoid is labeled LP. The operation of the parts is carried out in the same manner in most respects, except as noted hereinafter. In particular there is provided intervening means for preventing operation of the printing die shaft 85L under certain circumstances, particularly in the case of a stamp row having excessive length for the canceling die, even though the solenoid LP has been energized and the timing operation started. This intervening means includes a blocking element 117 rockable on a pivot 119, connected to an armature 121 of a print-allowing solenoid PA by a link 123. A spring 125 normally urges the armature 121 to an unactuated position and the blocking element 117 to a position in which it interferes with a shoulder 127 of the latch 89L to prevent withdrawal of the same. Thus only when the solenoid PA is energized does the blocking element 117 clear the shoulder 127 and permit normal time delayed operation of the printing die shaft 85L. To accommodate the parts when withdrawal is blocked, the lip 97L is swingably mounted on the latch 89L and is held in normal operating position by a compression spring 129. Whenever withdrawal of the latch 89L is prevented by the blocking element 117, the lip 97L is permitted to deflect sufficiently to permit the trip element 99L to bypass it and return to its latched position wtihout tripping the latch 89L.

Stacker gate mechanism

The gates 57T and 57L, previously described, serve to guide the letters into the appropriate stacker, and are pivoted by their rear portions at the forwardmost ends of dividing partitions or guides 131 and 133 respectively. The mechanism controlling their movement is shown especially in Figs. 4, 6 and 7 and will be described for a single gate 57L, it being understood that the other gate is controlled by similarly functioning parts each designated by the same numeral portion as the corresponding part followed by the postscript T.

The gate 57L is mounted on a vertical rock shaft 135L to which is secured a bell crank 139L having at one end a stop 141L and at the other a follower roller 143L intended for cooperation with the surface of a cam 145L affixed to and rotated by a shaft 147 which is moved in time with the letter feed mechanism in a conventional manner by suitable gearing (not shown). The side of the stop 141L is slightly undercut to provide a suggestion of a lip 149L, best seen in Fig. 7, which cooperates with the slightly beveled end 151L of a latch arm 153L actuated by armature 155L of a solenoid LG. The armature 155L is normally held by a spring 157L in a lowered position, such that beveled end 151L is in position to catch lip 149L and thus latch the stop arm 141L so that roller 143L is held away from the surface of cam 145L and strikes the same only lightly at the short high point or tripping surface 159L thereof. A heavy spring 161L urges the stop arm 141L against the end of latch arm 153L with considerable force, so that energization of solenoid LG is insufficient to pull in the armature 155L except during the period when the tripping surface 159L has engaged the roller 143L so as to extend the spring 161L slightly and release the pressure against the end of latch arm 153L.

A single normal cycle of operation of the gate mechanism, e.g. the lead gate mechanism, then, consists of energization of the solenoid LG by certain circuitry in response to a letter condition to be described hereinafter. Then when the proper instant of time occurs, the tripping surface 195L of cam 145L touches roller 143L and moves arm 141L of bell crank 139L so as to release momentarily the armature 155L, whereupon it is pulled in by solenoid LG raising latch arm 153L to non-latching position. When the low surface of the cam 145L comes into position, roller 143L follows it in under the influence of spring 161L, thus causing bell crank 139L to turn shaft 135L and swing the gate 57L to the left, as viewed from the hopper end, thus extending across the path of the oncoming letter, closing the passage 61, and directing the letter into stacker 41L. In the meantime energization of solenoid LG has ceased and spring 157L returns latch arm 153L until it presses on the upper surface of the stop 141L. As soon as the tripping surface 159L of cam 145L comes into contact with roller 143L again, the bell crank 139L is swung to return gate 57L to normal position and arm 153L automatically moves to latching position under the influence of spring 157L.

Electrical system

Figure 12:
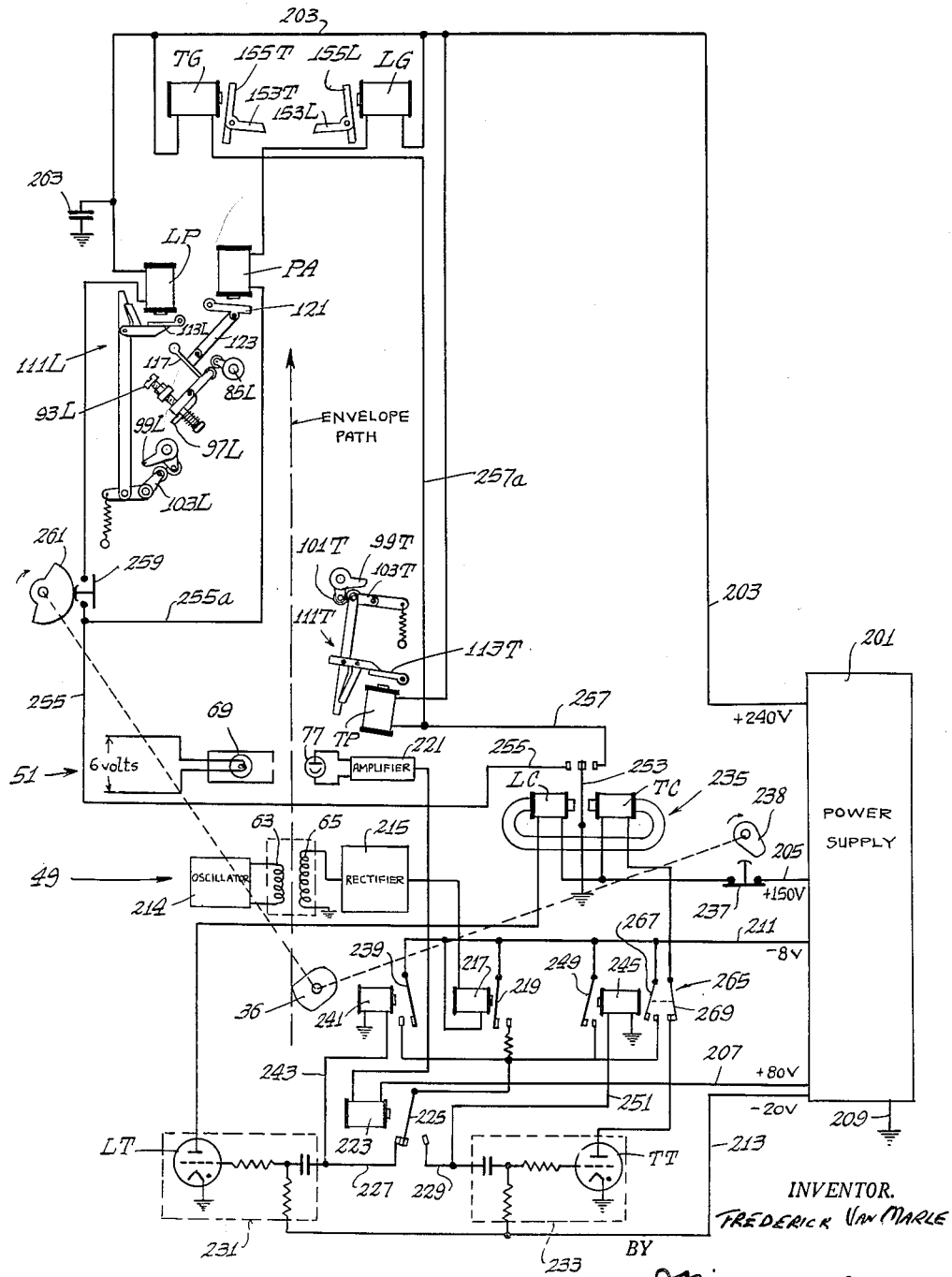
Fig. 12 is a schematic illustration showing certain mechanical features of the machine of the invention in conjunction with a diagram of the electrical features and the wiring therefor.

Fig. 12 is a schematic showing of the device, serving also as a wiring diagram, and illustrating the interconnection between the electrical and mechanical features. Included is a conventional electric power supply 201 having conductors 203, 205, 207, 209, 211 and 213 leading therefrom and providing direct current potentials of +240 volts, +150 volts, +80 volts, ground, −8 volts and −20 volts respectively for supplying various parts of the apparatus as seen in the diagram.

The primary 63 of the RF pickup is fed by an oscillator 214 which induces a voltage in the secondary 65. The output of the secondary 65 of the RF pickup is fed to a rectifier 215 and thence to a primary control relay 217, the switch 219 of which is normally held open by the induced voltage, but allowed to close momentarily when the coupling at 63, 65 is disturbed by a stamp passing through. The other side of relay 217 and one side of switch 219 are connected to lead 211 (−8 volts).

Figure 10:
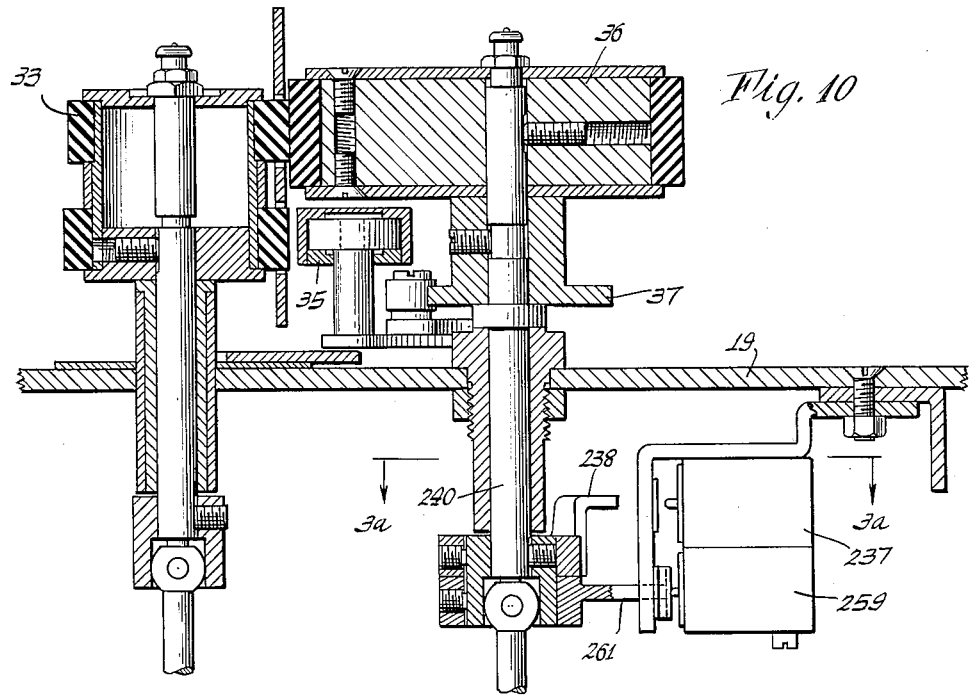
Fig. 10 is a section taken substantially on line 10—10 of Fig. 3 and drawn to a larger scale.

The output of the photoelectric cell 77 is fed to an amplifier 221 whose output is fed to a secondary control relay 223 and thence to lead 207 (+80 volts). In this case the relay switch 225 is a two position switch, permanently in series with switch 219, and makes contact with either conductor 227 or 229 which connect respectively with the control grid connections of a "lead" thyratron circuit 231 and a "trail" thyratron circuit 233, the thyratron tubes of which are designated LT and TT respectively. The plate of tube LT is connected to a "lead" coil LC of a polarized relay 235 and thence via a normally closed switch 237 to conductor 205 (+150 volts). The plate of tube TT is connected to a "trail" coil TC of the relay 235 and thence via the same switch 237 to the conductor 205. The switch 237 is controlled by a cam 238 on a shaft 240 which supports and drives the feed element 36, as seen in Figs. 3a and 10.

A normally open switch 239 of a relay 241 furnishes a holding bypass for the switch 219, and the relay 241 is connected into the control grid circuit of thyratron LT by a conductor 243 which connects with conductor 227 heretofore mentioned. The other side of the relay 241 is connected to ground. A similar holding bypass arrangement associated with the thyratron TT includes a relay 245 having a switch 249 and connected to conductor 229 via conductor 251.

Returning now to a consideration of the polarized relay 235, this is a balanced relay including a three position switch 253 whose blade is connected to ground and which makes contact with a lead circuit 255 when the lead coil LC is energized, with a trail circuit 257 when the trail coil TC is energized, and opens both circuits by becoming centered when both coils are either energized or deenergized at the same time. The lead circuit includes a normally closed switch 259 controlled by a cam 261 on the shaft 240 as seen in Figs. 3a and 10, the lead printing solenoid LP, and proceeds thence to +240 volt conductor 203. A condenser 263 is connected at one of its sides to the 240 volt side of solenoid LP and at the other side to ground. A branch or parallel circuit 255a includes the print-allowing solenoid PA, the lead gate solenoid LG and proceeds thence to conductor 203.

The circuit 257 with which the blade of switch 253 may also make contact, includes the trail printing solenoid TP and proceeds from there to conductor 203. A branch or parallel circuit 257a includes the trail gate solenoid TG and connects to conductor 203.

A manually operable gang switch 265 including a switch blade 267 for fixedly bypassing switch 219, and switch blade 269 for opening the plate circuit of the trail thyratron TT, serves to convert the equipment for ordinary canceling when desired.

*Operation*

The endmost envelope of the stack held in hopper 21 is fed forward by the feed element 36 in a manner described in my said patent application. This envelope may, for the purposes of this description, be in any one of six conditions as follows, all directions being as viewed by an observer standing at the hopper end and looking along the line of feed:

(1) The address surface of the envelope is facing left with the stamp at the bottom edge in leading position, as at X in Fig. 13.

(2) The address surface is facing right with the stamp at the bottom edge in trailing position, as at Y in Fig. 13.

(3) The envelope has the stamps at its upper edge and the address surface may be facing in either direction, such as indicated at Z—Z in Fig. 13.

(4) The same as condition 1 or 2, but the envelope is unstamped, not shown.

(5) The same as condition 1, except that the stamp row is too long to be properly canceled by the machine, not shown.

(6) The same as condition 2, except that the stamp row is too long to be properly canceled by the machine, not shown.

If the envelope is in condition 1, as it is fed forward, its stamp first disturbs the coupling at the stamp detecting device 49 deenergizing relay 217 and allowing switch 219 to close. This applies the —8 volts of conductor 211 via switch 225 to the input conductor 227 of thyratron circuit 231 embodying the lead thyratron LT. The thyratron LT will not fire at this time because of the —20 volt potential maintained on its control grid via conductor 213. Current passes through circuit 243 to energize relay 241 closing its switch 239 and forming a holding circuit around the switch 219 so that the —8 volts of conductor 211 continues to be applied via switch 239 even though the stamp may promptly leave the stamp detector 49. When the leading edge of the letter breaks the beam at the edge sensing device 51, relay 223 is deenergized and switch 225 swings to the other position. This suddenly removes the 8 volt negative voltage from the input to thyratron LT and also from the relay 241. The inductive reaction of the relay solenoid brings about a rapidly decaying transient voltage or "inductive kick" which is transmitted to the thyratron circuit 231 including the control grid thereof, and when in the positive range, causes the thyratron LT to fire, setting in motion the mechanisms necessary to operate on the envelope in condition 1. When switch 225 breaks contact with conductor 227, it interrupts the current path for relay 241, and removal of stamps from the stamp detector 49 returns switch 219 to open position. Thus even though the envelope leaves the edge detector 51, return of switch 225 to contact with conductor 227 cannot put the preliminary bias on the input to thyratron LT to prepare the same for firing unless and until the switch 219 is closed first. When the thyratron LT fires, the plate circuit energizes the coil LC of the polarized relay 235, causing blade 253 to move to the left and complete circuits 255 and 255a. This energizes solenoid LP operating linkage 111L to withdraw the latch 103L and start a time-delayed tripping of the lead printer 53L as heretofore described, so that the printer operates at the right instant to cancel the stamp on the lower left-hand side in the leading position, gauged from the time when the leading edge initiated action by affecting the edge detector 51. Furthermore, circuit 255a is also completed to energize the solenoid PA which acts through link 123 to withdraw stop 117 and therefore prevent interference with the printing action. At the same time, lead gate solenoid LG is energized to put its armature 155L under stress ready to pull in when it becomes unlatched as heretofore described, so that the lead gate 57L will be timed to operate at the proper instant closing the passage 61 and guiding the canceled envelope into lead stacker 41L.

When the envelope about to be fed by element 36 is in condition 2, the spacing of the detector will be found to be close enough together that the order of detection is reversed. Thus, the leading edge of the envelope first actuates the edge detector 51 deenergizing the relay 223 and causing the switch 225 to make contact with circuit 229. This does not fire thyratron LT because the initiating bias of —8 volts is lacking by reason of the open switch 219 as heretofore explained. Thereafter the stamp in trailing position affects the stamp detector 49 causing relay 217 to deenergize and its switch 219 to close. The negative voltage (—8 volts) is accordingly applied to the input conductor 229 of the circuit 233 of thyratron TT and relay 245 is energized to close the holding circuit switch 249. In this case the subsequent operations are triggered by the trailing edge of the envelope leaving the edge detector 51. This act reenergizes relay 223 to cause switch 225 to break contact with conductor 229 whereby the inductive kick of relay 245 applies sufficient positive voltage to the grid to fire the thyratron TT, causing current to flow in the plate circuit and energize the trail coil TC of the polarized relay 235. This action draws the switch 253 into position to complete circuits 257 and 257a. The former energizes trail printing solenoid TP, which via linkage 111T withdraws latch 103T and initiates the delayed tripping of trail printer 53T as heretofore described, so that the printer operates at the right instant to cancel the stamp on the lower right-hand side in trailing position, as gauged from the time when the trailing edge initiated action by leaving the edge detector 51. The completion of circuit 257a energizes the trail gate solenoid TG to put its armature under stress ready to pull in when it becomes unlatched as heretofore described, so that the trail gate 57T will be timed to operate at the proper instant, closing the passage 61 and guiding the canceled envelope into the trail stacker 41T.

If the next envelope to be canceled is in condition 3 or 4, there is no stamp positioned at a location which can affect the detector 49. Accordingly, switch 219 remains open throughout and there can be no firing of either thyratron. This being the case, neither printer is actuated, and neither gate is moved so that the envelope is fed through without canceling and is directed into passage 61 and finally into the stacker 45.

If the next envelope is in condition 5, the initial operation as previously described for condition 1 will obtain. However, the spacing between stamp detector 49 and edge detector 51 is such that it measures the length of the stamp strip which the printing die will properly cancel. If the stamp strip is longer than this predetermined length, then switch 219 will remain closed even after the firing of thyratron LT, whereby the relay 245 is also energized with the result that when the trailing edge of the envelope clears the edge detector 51, the thyratron TT is also fired. In effect then, the mechanism has read the envelope as carrying both a leading stamp and a trailing stamp and has energized both of the coils LC and TC of the relay 235 with the result that the switch blade 253 ends up in centered position with the machine accordingly set to feed the envelope directly through to passage 61 and into stacker 45. It will be remembered, however, that the thyratrons LT and TT are fired in sequence, so that there was a short period when the switch blade 253 of polarized relay 235 was in contact with conductor 255. At that instant a time delay cycle was instituted for causing the printer 53L to print on a stamp in lead position. That printing operation is defeated, however, for by the time the letter reaches the printing position for leading stamps, the relay 235 has already had its blade 253 centered, thus breaking the circuit of solenoid PA and causing the stop 117 to revert to interfering position under the influence of spring 125, Fig. 9. Then when the trip finger 99L reaches a tripping position, it will merely deflect the tongue 97L against the resistance of spring 129, Fig. 9, and no tripping of the printer latch will occur.

If the next envelope to be canceled is in condition 6, the operation is similar to that described for condition 5, for the positioning of the detectors 49, 51 and the length of the printing die are such that on any envelope of a length in general use, a stamp strip which is too long to be adequately defaced will approach near enough to the opposite envelope edge to actuate the stamp detector 49 before the envelope edge actuates the edge detector 51 even though the stamps are in trailing position. Thus, such an envelope will be read first as a leading stamp envelope, then as a trailing stamp envelope to balance the relay 235 as described for condition 5, and finally the solenoid PA will be deenergized to interfere with the timed printing operation which was instituted for the leading face.

It will be noted that cams 238 and 261 on shaft 240 of the feed element 36 operate respectively on switches 237 and 259 suitably located in the machine circuits. The effect of switch 237 when opened by cam 238 is to break momentarily the plate circuits of both thyratrons LT and TT just as a new feeding cycle is starting, thus making certain that thyratron firing is unquestionably interrupted and that the circuits are in proper condition for the new cycle of operation. Switch 259 is held open for the inactive portion of each cycle by the cam 261 to give opportunity for the capacitor 263 to charge up, but is permitted to close during the part of the cycle when the controlling operations would be active. In the normal state of affairs without the presence of switch 259, the circuit closing operation of relay 235 occurs so early in the cycle on the leading side that the circuit to solenoid LP is open for only a minor fraction of the cycle. This would not allow sufficient time for charging of the capacitor 263 between cycles when leading stamps occur successively. The function of the capacitor is to provide sufficient momentary power to insure instantaneous and full operation of the solenoid LP when energized, and by its use, when functioning as intended, regular positive operation is assured. By providing cam 261 to open the circuit 255 at the earliest possible moment (about 140° ahead of the normal opening due to cessation of thyratron firing resulting from the opening of switch 237) the capacitor is permitted to charge fully and insure proper operation. This makes it possible to hold the over-all cycle of the machine to the minimum period and thus provide a shorter and more compact device in all respects.

From the foregoing description it can be seen that the canceling and facing of mail can be effected in a most efficient manner with a minimum of equipment. It is merely necessary for the operator to straighten a bundle of mail into a stack as it comes in without facing it. The stack is inserted in hopper 21 and run once through the machine. A certain proportion of the bundle will be found to have arrived at stacker 45. This portion is removed, turned with the upper edge down, and then run through again. Then in stacker 41T is found a stacked group of canceled letters with the stamps at the lower edges and all facing one direction. In stacker 41L is found another stacked group of canceled letters in which the stamps are at the lower edges and all facing the opposite direction. By removing these groups and combining them after first inverting one group, the operation is substantially completed and yields the bundle of letters with stamps canceled and with all top edges in one direction and facing the same way. After the second run-through, a few abnormal letters, e.g. either unstamped or having excessively long stamp rows thereon, may be found in the stacker 45, in which case they would be given individual attention as by hand canceling or by transfer into a postage-due compartment.

In case there is occasion to do so, the device can be very quickly converted into a normally operating canceling machine. All that is necessary in this case is merely to operate the gang switch 265. This opens the plate circuit of the trail thyratron TT so that only the lead mechanisms are operative. It also closes a fixed by-pass circuit around the switch 219 so that the preparatory voltage of −8 volts is continuously available to thyratron circuit 231, and the thyratron LT is fired each time the leading edge of a letter affects the edge sensing device 51. In use, the operator, after throwing the switch 265, merely faces the envelopes and presents the stack to the feed mechanism with the stamps in the lower leading position. The envelopes are then automatically fed and canceled, and are collected in the lead stacker 41L.

While in order to comply with the statute the invention is described in language which is rather specific as to structural features and arrangements, it is to be understood that the invention is not limited to the specific details shown, but that the means and method herein disclosed comprises the preferred of several modes of putting the invention into effect, and the invention is therefore claimed in any of its forms or modifications within the scope of the language employed in the appended claims.

What is claimed is:

1. A device for working on articles carrying a designator adjacent one end or the other, in accordance with their endwise positioning when presented to the device, which comprises means for feeding articles one at a time along a predetermined path straight through the machine from their presented position; means for detecting the designator and means for detecting a predetermined end of the article in a given sequence depending upon the positioning of the designator with respect to the predetermined end of the article, both of said means being arranged adjacent said path in a predetermined relationship; and means responsive to detection of said designator prior to detection of said predetermined end for working on said article in one manner while advancing straight through said path, and responsive to detection of said predetermined end prior to detection of said designator for working on said article in another manner while advancing straight through said path.

2. A device for working on articles carrying a designator adjacent one or the other end, in accordance with their endwise positioning when presented to the device, which comprises means for feeding articles one at a time along a predetermined path straight through the machine from their presented position; means for detecting the designator and means for detecting the leading end of the article in a given sequence depending upon the positioning of the designator with respect to the predetermined end of the article, both of said means being arranged adjacent said path with the designator detector in advance of the leading end detector; and means responsive to detection of said designator prior to detection of said leading end for working on said article in one manner while advancing straight through said path, and responsive to detection of said leading end prior to detection of said designator for working on said article in another manner while advancing straight through said path.

3. A device for canceling stamps on mixed pieces of stamped letter mail comprising means for feeding the pieces one at a time along a predetermined path straight through the machine from a starting position; means for detecting a stamp and means for detecting the leading end and trailing end of the piece in a given sequence depending upon the positioning of the stamp with respect to the leading and trailing end of the piece, both of said means being arranged adjacent said path with the stamp detector in advance of the end detector; stamp canceling dies, one at each side of said path; and means responsive to detection of said stamp prior to detection of said leading end for operating one of said dies at a predetermined time after detection of the leading end of the fed piece to cancel a stamp on one surface thereof while the piece advances straight through said path, and responsive to detection of said leading end prior to detection of said stamp for operating the other of said dies at a predetermined time after detection of the trailing end of the fed piece to cancel a stamp on the other surface of the fed piece while the piece advances straight through said path.

References Cited in the file of this patent

UNITED STATES PATENTS

| | | |
|---|---|---|
| 1,217,092 | Hopp | Feb. 20, 1917 |
| 1,729,521 | Roddy | Sept. 24, 1929 |
| 2,325,927 | Wilbur | Aug. 3, 1943 |
| 2,580,670 | Gilbert | Jan. 1, 1952 |
| 2,719,629 | Robinson | Oct. 4, 1955 |

FOREIGN PATENTS

| | | |
|---|---|---|
| 675,556 | Great Britain | July 16, 1952 |